US009783755B2

(12) United States Patent
Kabata et al.

(10) Patent No.: US 9,783,755 B2
(45) Date of Patent: Oct. 10, 2017

(54) DRIVE DEVICE, IMAGE FORMING APPARATUS, AND GREASE COMPOSITION

(71) Applicants: Toshiyuki Kabata, Kanagawa (JP); Kumiko Seo, Kanagawa (JP); Masahiro Ishida, Kanagawa (JP); Naoki Matsuda, Kanagawa (JP); Teruyoshi Tanaka, Kanagawa (JP)

(72) Inventors: Toshiyuki Kabata, Kanagawa (JP); Kumiko Seo, Kanagawa (JP); Masahiro Ishida, Kanagawa (JP); Naoki Matsuda, Kanagawa (JP); Teruyoshi Tanaka, Kanagawa (JP)

(73) Assignees: Ricoh Company, Ltd., Tokyo (JP); Dow Corning Toray Co., Ltd., Tokyo (JP)

( * ) Notice: Subject to any disclaimer, the term of this patent is extended or adjusted under 35 U.S.C. 154(b) by 0 days.

(21) Appl. No.: 14/715,784

(22) Filed: May 19, 2015

(65) Prior Publication Data
US 2015/0344804 A1    Dec. 3, 2015

(30) Foreign Application Priority Data

May 29, 2014  (JP) .................................. 2014-111463
Mar. 9, 2015   (JP) .................................. 2015-045778

(51) Int. Cl.
*C10M 115/00*  (2006.01)
*C10M 117/02*  (2006.01)
(Continued)

(52) U.S. Cl.
CPC .......... *C10M 117/02* (2013.01); *C10M 115/00* (2013.01); *F16H 55/17* (2013.01);
(Continued)

(58) Field of Classification Search
CPC ............. C10M 115/00; C10M 143/00; C10M 2207/1265; C10M 2203/06; F16H 55/17;
(Continued)

(56) References Cited

U.S. PATENT DOCUMENTS 2,846,394 A    8/1958  Brunstrum et al.
3,003,962 A   10/1961  Jordan et al.
(Continued)

FOREIGN PATENT DOCUMENTS

CN    1534217 A    10/2004
CN    1821900 A     8/2006
(Continued)

OTHER PUBLICATIONS

European Search Report dated Oct. 13, 2015 issued in corresponding European Application No. 15168740.7.
(Continued)

*Primary Examiner* — Taiwo Oladapo
(74) *Attorney, Agent, or Firm* — Harness, Dickey & Pierce, P.L.C.

(57) ABSTRACT

A drive device includes a slide bearing; a shaft that passes through the slide bearing; a gear that is fixed to the shaft; and a grease composition that is held in a clearance between the slide bearing and the shaft. At least one of the slide bearing and the shaft is made of a resin. The clearance is in a range of 10 to 110 μm. The grease composition contains a hydrocarbon base oil and lithium soap serving as a thickener. A weight ratio of the hydrocarbon base oil to the lithium soap is in a range of 94.5:5.5 to 96.0:4.0. A consistency of the grease composition is in a range of 360 to 400.

10 Claims, 6 Drawing Sheets

(51) Int. Cl.
*F16H 55/17* (2006.01)
*F16H 57/04* (2010.01)
*F16C 17/02* (2006.01)
*C10M 143/00* (2006.01)
*F16C 33/10* (2006.01)
*F16C 33/12* (2006.01)

(52) U.S. Cl.
CPC ....... *F16H 57/0464* (2013.01); *C10M 143/00* (2013.01); *C10M 2203/003* (2013.01); *C10M 2203/06* (2013.01); *C10M 2207/1265* (2013.01); *C10M 2209/026* (2013.01); *C10N 2210/01* (2013.01); *C10N 2220/022* (2013.01); *C10N 2230/02* (2013.01); *C10N 2230/76* (2013.01); *C10N 2240/02* (2013.01); *C10N 2240/203* (2013.01); *C10N 2250/10* (2013.01); *F16C 17/02* (2013.01); *F16C 33/102* (2013.01); *F16C 33/121* (2013.01); *F16C 2208/66* (2013.01); *F16C 2240/46* (2013.01); *Y10T 74/19651* (2015.01)

(58) Field of Classification Search
CPC .............. F16H 57/0464; F16C 2208/66; F16C 2240/46; F16C 33/102; F16C 33/121; F16C 17/02; Y10T 74/19651; C10N 2240/203; C10N 2230/02; C10N 2210/01; C10N 2240/02; C10N 2220/022; C10N 2250/10; C10N 2230/76
See application file for complete search history.

(56) References Cited

U.S. PATENT DOCUMENTS

| | | | |
|---|---|---|---|
| 5,690,292 A | 11/1997 | Sano | |
| 7,662,885 B2 | 2/2010 | Coffey et al. | |
| 7,759,415 B2 | 7/2010 | Coffey et al. | |
| 8,242,065 B2 | 8/2012 | Sawaguchi et al. | |
| 9,061,698 B2 | 6/2015 | Wakugawa et al. | |
| 2003/0022797 A1 | 1/2003 | Oohira et al. | |
| 2003/0081351 A1 | 5/2003 | Parsoneault et al. | |
| 2004/0248688 A1 | 12/2004 | Shimada | |
| 2005/0069357 A1 | 3/2005 | Kabata et al. | |
| 2006/0182474 A1 | 8/2006 | Naito et al. | |
| 2006/0199896 A1 | 9/2006 | Walton et al. | |
| 2006/0213303 A1 | 9/2006 | Shigemi et al. | |
| 2006/0269323 A1 | 11/2006 | Kabata et al. | |
| 2007/0110488 A1 | 5/2007 | Kabata et al. | |
| 2007/0242910 A1 | 10/2007 | Akita et al. | |
| 2008/0069635 A1 | 3/2008 | Maehata et al. | |
| 2008/0089713 A1 | 4/2008 | Ishida et al. | |
| 2008/0226344 A1* | 9/2008 | Cha ..................... G03G 15/757 399/167 | |
| 2009/0182114 A1 | 7/2009 | Kusaka et al. | |
| 2010/0197540 A1 | 8/2010 | Shan et al. | |
| 2010/0239318 A1 | 9/2010 | Maehata et al. | |
| 2011/0007990 A1 | 1/2011 | Kawamura | |
| 2011/0129270 A1 | 6/2011 | Seo et al. | |
| 2011/0152139 A1 | 6/2011 | Akita et al. | |
| 2011/0160105 A1 | 6/2011 | Tanaka et al. | |
| 2011/0170892 A1 | 7/2011 | Ishida et al. | |
| 2011/0306527 A1 | 12/2011 | Bouffet et al. | |
| 2012/0060633 A1 | 3/2012 | Ishida et al. | |
| 2012/0106881 A1* | 5/2012 | Akita ................... C10M 101/02 384/279 |
| 2012/0142566 A1 | 6/2012 | Yamamoto | |
| 2014/0060484 A1 | 3/2014 | Hiramoto et al. | |
| 2014/0119799 A1 | 5/2014 | Kabata et al. | |
| 2014/0226927 A1 | 8/2014 | Ishii et al. | |
| 2014/0239760 A1* | 8/2014 | Asai ....................... H02K 7/116 310/83 |
| 2015/0060191 A1 | 3/2015 | Matsuda et al. | |
| 2015/0110517 A1 | 4/2015 | Ishida et al. | |
| 2015/0344809 A1 | 12/2015 | Kabata et al. | |

FOREIGN PATENT DOCUMENTS

| | | |
|---|---|---|
| CN | 1837651 A | 9/2006 |
| CN | 101213244 A | 7/2008 |
| CN | 101990569 A | 3/2011 |
| CN | 102134523 A | 7/2011 |
| CN | 102348790 A | 2/2012 |
| CN | 102471718 A | 5/2012 |
| CN | 103045334 A | 4/2013 |
| CN | 103727216 A | 4/2014 |
| EP | 1806512 A1 | 7/2007 |
| JP | 9-017148 | 1/1997 |
| JP | 11-167234 | 6/1999 |
| JP | 2001-089778 | 4/2001 |
| JP | 2001-228660 | 8/2001 |
| JP | 2003-312868 | 11/2003 |
| JP | 2004225809 A | 8/2004 |
| JP | 2005-329849 A | 12/2005 |
| JP | 2007-070461 A | 3/2007 |
| JP | 2007297449 A | 11/2007 |
| JP | 2008031406 A | 2/2008 |
| JP | 2010-083658 | 4/2010 |
| JP | 2011148908 A | 8/2011 |
| JP | 5054668 B2 | 10/2012 |
| JP | 2013185027 A | 9/2013 |
| JP | 2013-234758 A | 11/2013 |
| WO | WO-2010003918 A1 | 1/2010 |
| WO | WO-2013/042715 A1 | 3/2013 |

OTHER PUBLICATIONS

European Search Report issued on Oct. 2, 2015 for corresponding European Patent Application No. 15169233.2.
Chinese Office Action dated Feb. 17, 2017 for corresponding Chinese Patent Application No. 201510282249.0 and English Translation thereof.
Infineum SV150 Dissolving Guide, May 2007.
U.S. Office Action dated Apr. 21, 2017 for U.S. Appl. No. 14/719,471.
U.S. Office Action dated May 19, 2017 for U.S. Appl. No. 14/717,403.
U.S. Office Action dated Aug. 1, 2017 for U.S. Appl. No. 14/719,471.

* cited by examiner

DRIVE DEVICE, IMAGE FORMING APPARATUS, AND GREASE COMPOSITION

CROSS-REFERENCE TO RELATED APPLICATIONS

The present application claims priority to and incorporates by reference the entire contents of Japanese Patent Application No. 2014-111463 filed in Japan on May 29, 2014 and Japanese Patent Application No. 2015-045778 filed in Japan on Mar. 9, 2015.

BACKGROUND OF THE INVENTION

1. Field of the Invention

The present invention relates to a drive device and an image forming apparatus that use a grease composition, and the grease composition used for the drive device and the image forming apparatus.

2. Description of the Related Art

Image forming apparatuses employing an electrophotographic process use many drive devices in mechanisms for an image reading process, an image forming process, a transfer process, and a paper conveyance process, for example. Conventional image forming apparatuses are large-sized and handled as precision apparatuses. The image forming apparatuses are, thus, often installed in places apart from people who perform office operations in offices such as dedicated rooms provide for the apparatuses. Sounds generated during the process for forming images by such image forming apparatuses, thus, are not a serious problem. In fact, the start of forming an image is checked by the generated sound and the end of forming the image is recognized by the stop of the sound.

With the progress of downsizing of the image forming apparatuses in recent years, cases have been increased in which the image forming apparatuses are installed in places just near users such as on the user's desks or side desks. A plurality of users often access an image forming apparatus through a local area network (LAN) to instruct the image forming apparatus to form an image using user's personal computers. As a result, the operating rate of the image forming apparatus tends to be increased. Sounds generated by the image forming apparatuses, which have not been a serious problem, can be often hard to bear for the users near the place in which the image forming apparatuses are installed. In addition, offices are quiet these days. Sounds generated from the image forming apparatuses, thus, become more noticeable.

Most of the generation sources of sounds from the image forming apparatuses are the drive devices described above. The drive devices drive objects by transmitting kinetic energy from the driving sources such as motors to the objects through gears and belts, for example. The image forming apparatuses each include many drive devices. In particular, the gears are very important parts for the transmission of the kinetic energy of the driving sources. Such a drive device is usually provided with many gears. A sound is generated from the drive device due to rubbing between tooth flanks of engaged gears, rubbing between a slide bearing and a shaft to which a gear is fixed, and rubbing between a shaft fixed non-rotatably and the gear rotating on the shaft, for example.

As examples the image forming apparatuses that reduce a noise generated by rubbing between the tooth flanks of the gears, image forming apparatuses in Japanese Patent Application Laid-open No. 2010-083658 and Japanese Patent Application Laid-open No. 2003-312868 have been developed that reduce a noise by a grease composition applied on the tooth flanks of the gears. In Japanese Patent Application Laid-open No. 2001-228660, a drive device is disclosed that uses gears having grooves to hold a grease composition for preventing the grease composition from coming off from the tooth flanks. As examples such as the image forming apparatuses and the drive devices described above, conventionally, it has been common practice to apply a grease composition used for reducing a noise mainly on gears. It is considered that a slightly hard grease composition containing a solid lubricant such as polytetrafluoroethylene, molybdenum disulfide, graphite, or melamine cyanurate has a high effect of reducing a noise. Such a grease composition prevents a hitting sound from being generated by a direct contact between the gears, and reduces friction and wear between the gears, thereby making it possible to maintain the smooth rotation of the gears. The reason why a slightly hard grease composition, specifically, a grease composition having a low consistency, is used is that an excessively soft grease composition may come off from the tooth flanks by a centrifugal force during the operation of the drive device. Conventionally, it has been considered that a noise from the drive device is mainly generated from the tooth flanks of gears and a noise generated between a slide bearing and a shaft that passes through the slide bearing (hereinafter the shaft is also described as a member that fixes a gear) is not considerable.

The present inventors have found that it is very important to prevent a noise generated between the slide bearing and the shaft passing through the slide bearing as a result of research for more effectively reducing a noise generated from the drive device. The shaft passing through the slide bearing is often directly connected to a motor serving as a driving source, or disposed at a position at which an object is lastly driven. The shaft passing through the slide bearing rotates at a high speed and torque applied to the shaft, thus, fluctuates relatively largely. It has been found that the slide bearing and the shaft passing through the slide bearing largely influence a noise generated from the whole of the drive device although the noise generated by the sliding movement therebetween is relatively small. A noise generated between the slide bearing and the shaft passing through the slide bearing is caused by the shaft not rotating smoothly. An adverse effect due to the shaft not rotating smoothly is propagated to other gears, thereby causing the generation of a large noise as the whole of the drive device.

The shaft that cannot smoothly rotate in the slide bearing shortens the operating life of the slide bearing. Specifically, the slide bearing is usually often made of a plastic material because the plastic material can achieve weight reduction, easy maintenance of parts, and cost reduction, for example. When the shaft passing through the slide bearing (member that fixes a gear) is made of a metallic material and rotates unstably while being in direct contact with the slide bearing, the shaft readily causes the slide bearing to be worn or damaged. With increasing degree of wear or damage of the slide bearing, the shaft rotates further unstably, thereby causing a large noise. As a result, the slide bearing needs to be replaced at an early stage before the end of its operating life.

The present inventors have conducted experiments to reduce the wear of the slide bearing by providing grease compositions between the slide bearing and the shaft passing through the slide bearing. It has been found that most of the grease compositions containing a solid lubricant provide almost no effect on the rubbing between the slide bearing and the shaft passing through the slide bearing, and in fact some of the grease compositions often worsen the noise. Most of the grease compositions that worsen the noise reduce the noise when they are applied on the tooth flanks of the gears. The reason why such grease compositions often worsen the noise is that a solid lubricant in a large size is caught to the slide bearing or the shaft due to a small clearance between the slide bearing and the shaft passing through the slide bearing, thereby hindering the rotation of the shaft.

The slide bearing made of a plastic material is inferior to that made of a metallic material (including alloys) in dimensional accuracy after molding. It is, thus, difficult to reduce a dimensional variation of the clearance between the slide bearing and the shaft passing through the slide bearing. The solid lubricant having a relatively large size contained in the grease composition is, thus, readily caught to the slide bearing or the shaft, thereby hindering the rotation of the shaft. As a result, a noise is generated.

An object of the present invention is to provide a drive device, an image forming apparatus, and a grease composition that can prevent the occurrence of a noise while maintaining a smooth rotation of a shaft passing through a slide bearing.

According to an embodiment, a drive device includes a slide bearing; a shaft that passes through the slide bearing; a gear that is fixed to the shaft; and a grease composition that is held in a clearance between the slide bearing and the shaft. At least one of the slide bearing and the shaft is made of a resin. The clearance is in a range of 10 to 110 μm. The grease composition contains a hydrocarbon base oil and lithium soap serving as a thickener. A weight ratio of the hydrocarbon base oil to the lithium soap is in a range of 94.5:5.5 to 96.0:4.0. A consistency of the grease composition is in a range of 360 to 400.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes an embodiment of a drive device and an image forming apparatus according to the present invention.

First, the experiments conducted by the present inventors are described. The present inventors have examined a relation between a slide bearing and a shaft (hereinafter the shaft is also described as a member that fixes a gear) passing through the slide bearing to conduct research on how to properly maintain a smooth rotation of the shaft passing through the slide bearing. It has been found that friction between the slide bearing and the shaft passing through the slide bearing is ideally in a fluid friction state, and it is important to stably provide a grease composition between the slide bearing and the shaft passing through the slide bearing over a long period of time. It has been also found that, when a relatively hard grease composition is applied between the slide bearing and the shaft passing through the slide bearing, an extremely small gap is generated therebetween, thereby making it difficult to maintain a smooth rotation of the shaft passing through the slide bearing. It has been further found that when a relatively soft grease composition is applied between the slide bearing and the shaft passing through the slide bearing, the grease composition is present between the slide bearing and the shaft immediately after the application, but an extremely gap is generated therebetween after a long period of time has elapsed. This makes it difficult to maintain a smooth rotation of the shaft. The reason why the extremely small is generated is that the rotation of the shaft passing through the slide bearing accelerates an outflow of the soft grease composition.

The present inventors conducted experiments as follows.

A grease composition 1 was prepared by the following formulation:

Synthetic oil having a kinetic viscosity of 24 $mm^2/s$: 74% by weight

Lithium soap: 9% by weight

Polytetrafluoroethylene (PTFE): 5% by weight

Molybdenum disulfide: 4% by weight

Melamine cyanurate: 8% by weight

The consistency (determined by Japanese Industrial Standards (JIS) K2220) of the grease composition 1 was 300.

A grease composition 2 was prepared by the following formulation:

Synthetic oil having a kinetic viscosity of 12 $mm^2/s$: 90% by weight

Lithium soap: 3.8% by weight

Styrene additive: 6.2% by weight

The consistency of the grease composition 2 was 370.

Figure 1:
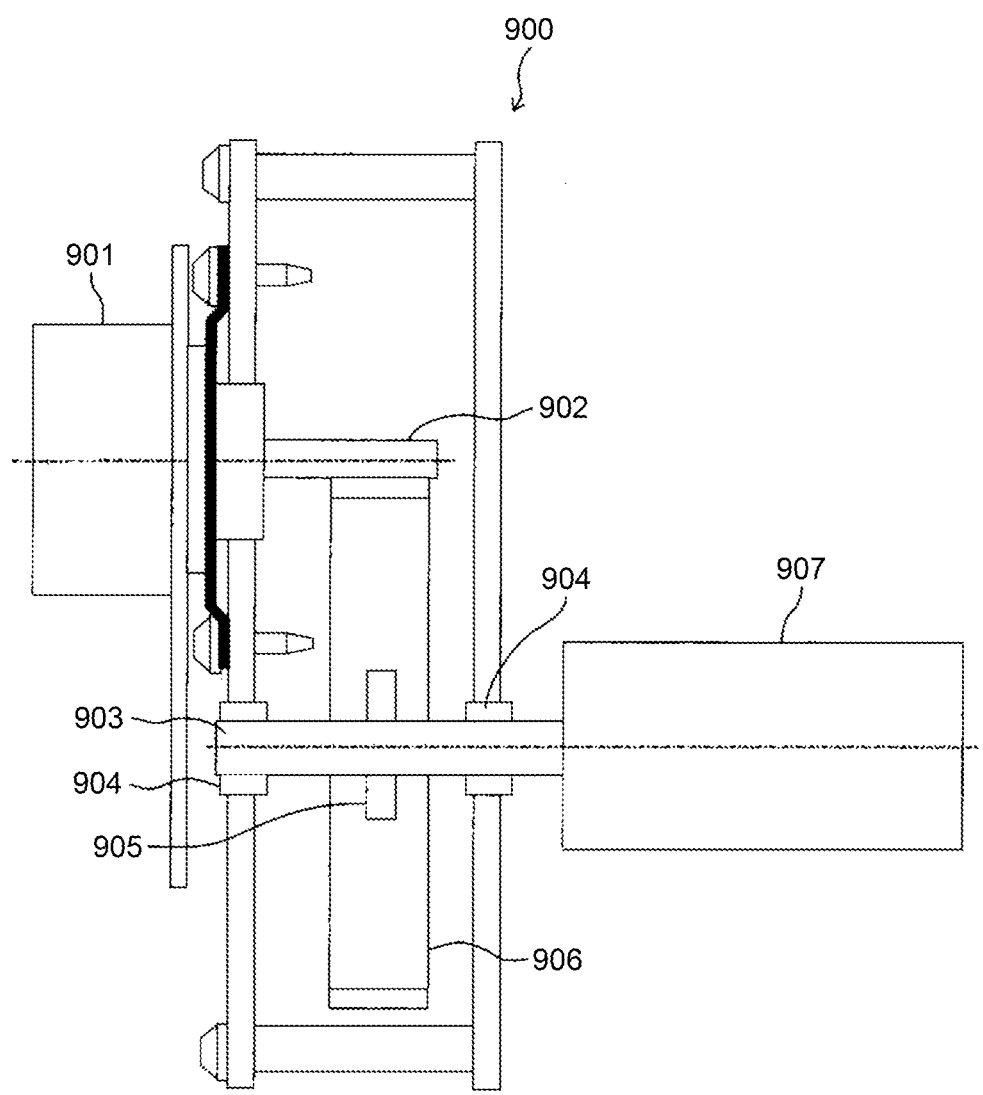
FIG. 1 is a schematic structural diagram illustrating a first test drive device used in experiments.

FIG. 1 is a schematic structural diagram illustrating a first test drive device used for the experiments. In FIG. 1, a motor gear 902 (made of a free-cutting steel) of a first test drive device 900 has 9 teeth, a module of 0.5, and a twist angle of 16°. A gear 906 (made of polyacetal) has 109 teeth, a module of 0.5, and a twist angle of 16°. The hole diameter of two slide bearings 904 (made of a polyacetal resin) that support a shaft 903 is 6.03 mm. The two slide bearings 904 have the same structural relation with respect to the shaft 903. The structural relation with respect to the shaft 903 is, thus, described on one slide bearing 904 in the following description. The outer diameter of the shaft 903 (made of a free-cutting steel) is 5.99 mm. The clearance between the slide bearing 904 and the shaft 903 was measured. Specifically, the hole diameter of the slide bearing 904 was measured over the whole periphery of the hole and a maximum value and a minimum value were identified. The diameter of the shaft 903 was measured over the whole periphery of the shaft and a maximum value and a minimum value were identified. The minimum value of the diameter of the shaft 903 was subtracted from the maximum value of the hole diameter of the slide bearing 904. The subtraction result was obtained as a maximum clearance value. The maximum value of the diameter of the shaft 903 was subtracted from the minimum value of the hole diameter of the slide bearing 904. The subtraction result was obtained as a minimum clearance value. The maximum and the minimum values were obtained in micro-meters, and rounded off to the first decimal place. The resulting values were 18 μm each. The clearance was measured in the same manner as described above in other experiments. The value obtained by rounding off the maximum value to the first decimal place and the value obtained by rounding off the minimum value to the first decimal place were equal to each other in all of the clearances.

A motor 901 rotated at 2750 rpm and nothing was provided between the slide bearing 904 and the shaft 903. After three minutes, a noise generated from the whole of the device was measured as a noise without grease.

In the following description, the experiment condition showing a relatively favorable result is referred to as an "Example", while the experiment condition showing an unfavorable result is referred to as a "Comparative example".

Comparative Example 1

The grease composition 1 was applied between the slide bearing 904 and the shaft 903, and the motor 901 rotated at 2750 rpm. After three minutes, a noise generated from the whole of the device was measured. The measurement result was subtracted from the noise without grease. The resulting value was obtained as a noise improvement amount. When the value was negative, the value was not the noise improvement amount but was actually a noise deterioration amount.

Example 1

The grease composition 2 was applied between the slide bearing 904 and the shaft 903, and the motor 901 rotated at 2750 rpm. After three minutes, a noise generated from the whole of the device was measured. The measurement result was subtracted from the noise without grease. The resulting value was obtained as a noise improvement amount.

Example 2

A noise improvement amount was obtained under the same conditions as Example 1 except that the shaft 903 used in Example 1 was replaced with the shaft 903 the clearance between which and the slide bearing 904 was 10 μm.

Comparative Example 2

A noise improvement amount was obtained under the same conditions as Comparative example 1 except that the shaft 903 used in Comparative example 1 was replaced with the shaft 903 the clearance between which and the slide bearing 904 was 10 μm.

Comparative Example 3

A noise improvement amount was obtained under the same conditions as Example 1 except that the shaft 903 used in Example 1 was replaced with the shaft 903 the clearance between which and the slide bearing 904 was 6 μm.

Comparative Example 4

A noise improvement amount was obtained under the same conditions as Comparative example 1 except that the shaft 903 used in Comparative example 1 was replaced with the shaft 903 the clearance between which and the slide bearing 904 was 6 μm.

The results are illustrated in Table 1.

TABLE 1

|  | Clearance [μm] | Grease | Noise improvement amount [dB] |
| --- | --- | --- | --- |
| Example 1 | 18 | Grease 2 | 0.4 |
| Example 2 | 10 | Grease 2 | 0.2 |
| Comparative example 1 | 18 | Grease 1 | −0.3 |
| Comparative example 2 | 10 | Grease 1 | −0.4 |
| Comparative example 3 | 6 | Grease 2 | −0.4 |
| Comparative example 4 | 6 | Grease 1 | −1.3 |

From the results, it was found that the noise can be effectively reduced by using the grease composition having a relatively large consistency and increasing the clearance to a relatively large value.

Next, grease compositions 3 to 12 were prepared in accordance with the formulations illustrated in Table 2. When the styrene additive was used for a base grease composition containing base oils and lithium soap, the mixture of the base oils and the styrene additive dispersed in the base oils in advance and additives were added, and then resulting mixture was stirred so as to prepare a lubricant grease composition.

TABLE 2

| Grease | 3 | 4 | 5 | 6 | 7 | 8 | 9 | 10 | 11 | 12 |
| --- | --- | --- | --- | --- | --- | --- | --- | --- | --- | --- |
| Base oil a | 89.6 | 80.8 | 81.3 | 80.4 | 83.7 | 85.0 | — | 42.5 | 91.9 | 89.9 |
| Base oil b | — | — | — | — | — | — | 82.3 | 49.4 | — | — |
| Lithium soap | 4.8 | 4.2 | 3.7 | 4.6 | 3.7 | 5.0 | 7.7 | 3.7 | 3.7 | 1.2 |
| Olefin resin powder | — | 9.4 | 9.4 | 9.4 | 7.0 | 9.4 | 9.4 | — | — | — |
| Styrene additive | 5.0 | 5.0 | 5.0 | 5.0 | 5.0 | — | — | 3.8 | 3.8 | 8.3 |
| Antioxidant | 0.5 | 0.5 | 0.5 | 0.5 | 0.5 | 0.5 | 0.5 | 0.5 | 0.5 | 0.5 |
| Corrosion inhibitor | 0.1 | 0.1 | 0.1 | 0.1 | 0.1 | 0.1 | 0.1 | 0.1 | 0.1 | 0.1 |
| Base oil viscosity [mm$^2$/s] | 18 | 18 | 18 | 18 | 18 | 18 | 9850 | 533 | 18 | 18 |
| *Rate of lithium soap [wt %] | 5.1 | 4.9 | 4.4 | 5.4 | 4.2 | 5.6 | 8.6 | 3.9 | 3.9 | 1.3 |
| Consistency | 394 | 376 | 396 | 361 | 394 | 448 | 358 | 357 | 455 | 402 |

*Lithium soap/(Hydrocarbon base oil + Lithium soap)

The specific substances of the respective components illustrated in Table 2 are as follows:
Base oil a: poly-α-olefin (18 mm²/s at 40° C.)
Base oil b: ethylene-α-olefin oligomer (9850 mm²/s at 40° C.)
Lithium soap: lithium 12-hydroxystearate
Olefin resin powder: polyethylene powder (average particle diameter of 12 μm)
Styrene additive: hydrogenated styrene-isoprene block copolymer (styrene content of 36% by weight)
Antioxidant: Adekastab QL manufactured by ADEKA Corporation
Corrosion inhibitor: Irgamet 39 manufactured by BASF The values of the base oil viscosity, the consistency, and the lithium soap rate in Table 2 were measured by the following manner:
Base oil viscosity: a kinetic viscosity at 40° C. measured according to JIS K 2283
Consistency: mixture consistency measured according to JIS K2220
Lithium soap rate: a rate of the lithium soap weight to the total weight of the base oils and the lithium soap Example 3

A noise improvement amount was obtained under the same conditions as Example 1 except that the shaft 903 used in Example 1 was replaced with the shaft 903 the clearance between which and the slide bearing 904 was 50 μm, and the grease composition 3 was used instead of the grease composition 2.

Example 4

A noise improvement amount was obtained under the same conditions as Example 1 except that the shaft 903 used in Example 1 was replaced with the shaft 903 the clearance between which and the slide bearing 904 was 85 μm, and the grease composition 3 was used instead of the grease composition 2.

Example 5

A noise improvement amount was obtained under the same conditions as Example 1 except that the shaft 903 used in Example 1 was replaced with the shaft 903 the clearance between which and the slide bearing 904 was 110 μm, and the grease composition 3 was used instead of the grease composition 2.

Comparative Example 5

A noise improvement amount was obtained under the same conditions as Example 1 except that the shaft 903 used in Example 1 was replaced with the shaft 903 the clearance between which and the slide bearing 904 was 125 μm, and the grease composition 3 was used instead of the grease composition 2.

The results are illustrated in Table 3.

TABLE 3

|  | Clearance [μm] | Grease | Noise improvement amount [dB] |
|---|---|---|---|
| Example 3 | 50 | Grease 3 | 0.6 |
| Example 4 | 85 | Grease 3 | 0.5 |
| Example 5 | 110 | Grease 3 | 0.2 |
| Comparative example 5 | 125 | Grease 3 | 0.0 |

From the results illustrated in Tables 1 and 3, it was found that the clearance needs to be set in a range of 10 to 110 μm in order to effectively reduce the noise.

Examples 5 to 8 and Comparative Examples 6 to 10

The shaft 903 the clearance between which and the slide bearing 904 was 50 μm was used in the same manner as in Example 3. Nothing was provided between the slide bearing 904 and the shaft 903, and the motor 901 rotated at 2750 rpm. After three minutes, a noise generated from the whole of the device was measured. Then, the grease composition 4 was applied between the slide bearing 904 and the shaft 903, and the motor 901 rotated at 2750 rpm. After 60 minutes, a noise generated from the whole of the device was measured. The measurement result was subtracted from the noise when no grease composition was applied. The resulting value was obtained as a noise improvement amount. A noise improvement amount was obtained also for each of the grease compositions 5 to 12 in the same manner as described above.

The results are illustrated in Table 4.

TABLE 4

|  | Grease | Base oil viscosity | Rate of lithium soap | Consistency | Noise improvement amount [dB] |
|---|---|---|---|---|---|
| Example 5 | Grease 4 | 18 | 4.9 | 376 | 0.8 |
| Example 6 | Grease 5 | 18 | 4.4 | 396 | 0.8 |
| Example 7 | Grease 6 | 18 | 5.4 | 361 | 0.7 |
| Example 8 | Grease 7 | 18 | 4.2 | 394 | 0.4 |
| Comparative example 6 | Grease 8 | 18 | 5.6 | 448 | −0.1 |
| Comparative example 7 | Grease 9 | 9850 | 8.6 | 358 | −0.2 |
| Comparative example 8 | Grease 10 | 533 | 3.9 | 357 | −0.3 |
| Comparative example 9 | Grease 11 | 18 | 3.9 | 455 | −0.1 |
| Comparative example 10 | Grease 12 | 18 | 1.3 | 402 | −0.1 |

The first test drive device 900 was used for the experiments described above as the drive device.

Examples 9 to 11 and Comparative Examples 11 and 12

Figure 2:
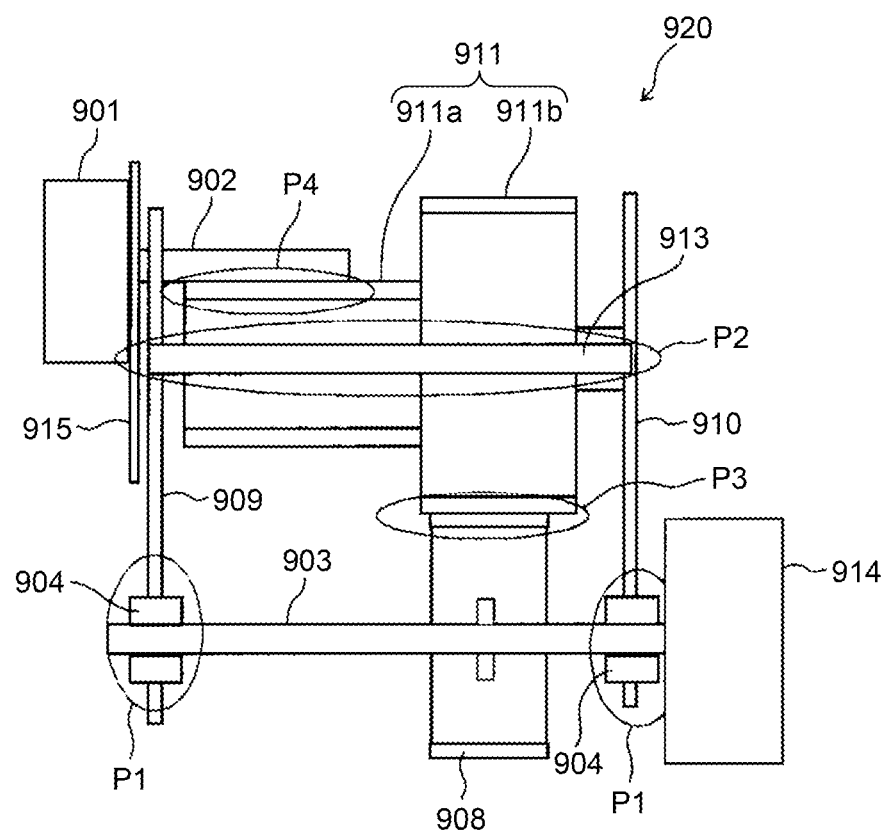
FIG. 2 is a schematic structural diagram illustrating a second test drive device used for experiments.

FIG. 2 is a schematic structural diagram illustrating a second test drive device 920 used for the experiments. In the second test drive device 920, the slide bearing 904 is provided to each of a first side plate 909 and a second side plate 910. A second gear 908 is fixed to the shaft 903 passing through the two slide bearings 904. A fixed shaft 913 is extended between the first side plate 909 and the second side plate 910 is unrotatably fixed thereto. A first gear 911 having a through hole is mounted on the fixed shaft 913. The fixed shaft 913 rotatably supports the first gear 911. The first gear 911 has a driving gear portion 911a and a driven gear portion 911b, both of which rotate around the same axial line and are integrally formed.

To one end of the shaft 903 that is rotatably supported by the slide bearing 904, a pseudo load 914 serving as an object to be driven is fixed. The motor gear 902 engages with the driving gear portion 911a of the first gear 911. A rotational driving force of the motor gear 902 is transmitted to the pseudo load 914 through the first gear 911, the second gear 908, and the shaft 903.

The specifications of the individual elements of the second test drive device 920 are illustrated in Table 5.

TABLE 5

| | First gear | | | |
|---|---|---|---|---|
| | Motor gear | Driving gear portion | Driven gear portion | Second gear |
| Material | SUS | POM | POM | POM |
| Number of teeth | 13 | 62 | 58 | 70 |
| Module | | 0.4 | | 0.6 |
| Torsion angle [°] | | 16 | | 16 |
| Engaging tooth width [mm] | | 12 | | 8 |
| Shaft diameter [mm] | — | | φ6 | φ6 |
| Material of slide bearing | | | | POM |
| Clearance [mm] | | | 0.05 | 0.05 |

POM: Polyoxymethylene, known as polyacetal resin

The motor 901 rotated at 2500 rpm under the condition in which no grease composition was applied to the individual elements of the second test drive device 920. After three minutes, a noise generated from the whole of the device was measured. Then, a grease composition was applied to a first portion P1 and a second portion P2 in the second test drive device 920. The first portion P1 is the portion between the slide bearing 904 and the shaft 903. The second portion P2 is the portion between the fixed shaft 913 and the inner peripheral surface of the through hole of the first gear 911. The grease composition was applied to the first portion P1 and the second portion P2. Thereafter, the motor 901 rotated at 2750 rpm. After 30 minutes, a noise generated from the whole of the device was measured. The measurement result was subtracted from the noise when no grease composition was applied. The resulting value was obtained as a noise improvment amount. The grease composition 4 was used in Example 9, the grease composition 5 was used in Example 10, and the grease composition 6 was used in Example 11. The grease composition 1 was used in comparative example 11, while the grease composition 9 was used in comparative example 12.

Table 6 illustrates the results of those experiments.

TABLE 6

| | Grease | Base oil viscosity | Rate of lithium soap | Consistency | Noise improvment amount [dB] |
|---|---|---|---|---|---|
| Example 9 | Grease 4 | 18 | 4.9 | 376 | 1.5 |
| Example 10 | Grease 5 | 18 | 4.4 | 396 | 1.4 |
| Example 11 | Grease 6 | 18 | 5.4 | 361 | 1.5 |
| Comparative example 11 | Grease 1 | 24 | 10.8 | 300 | −0.5 |
| Comparative example 12 | Grease 9 | 9850 | 8.6 | 358 | −0.3 |

From Tables 4 and 6, it is understood that the grease composition satisfying the following conditions needs to be used for effectively reducing a noise. The weight ratio of the hydrocarbon base oil to the lithium soap (hydrocarbon base oil:lithium soap) is in a range of 94.5:5.5 to 96.0:4.0 and the consistency is in a range of 360 to 400.

Examples 12 to 14 and Comparative Example 13

An experiment was conducted to obtain a noise improvement amount in the same manner as in Example 9 except that the grease composition 4 was applied to a third portion P3 and a fourth portion P4 in addition to the first portion P1 and the second portion P2. This experiment was Example 12. The third portion P3 is the tooth flanks of the driven gear portion 911b of the first gear 911 and the tooth flanks of the second gear. The fourth portion P4 is the tooth flanks of the motor gear 902 and the tooth flanks of the driving gear portion 911a of the first gear 911.

An experiment was conducted to obtain a noise improvement amount in the same manner as in Example 10 except that the grease composition 5 was applied to the third portion P3 and the fourth portion P4 in addition to the first portion P1 and the second portion P2. This experiment was Example 13. An experiment was conducted to obtain a noise improvement amount in the same manner as in Example 11 except that the grease composition 6 was applied to the third portion P3 and the fourth portion P4 in addition to the first portion P1 and the second portion P2. This experiment was Example 14. An experiment was conducted to obtain a noise improvement amount in the same manner as in Comparative example 11 except that the grease composition 1 was applied to the third portion P3 and the fourth portion P4 in addition to the first portion P1 and the second portion P2. This experiment was Comparative example 13.

Figure 7:
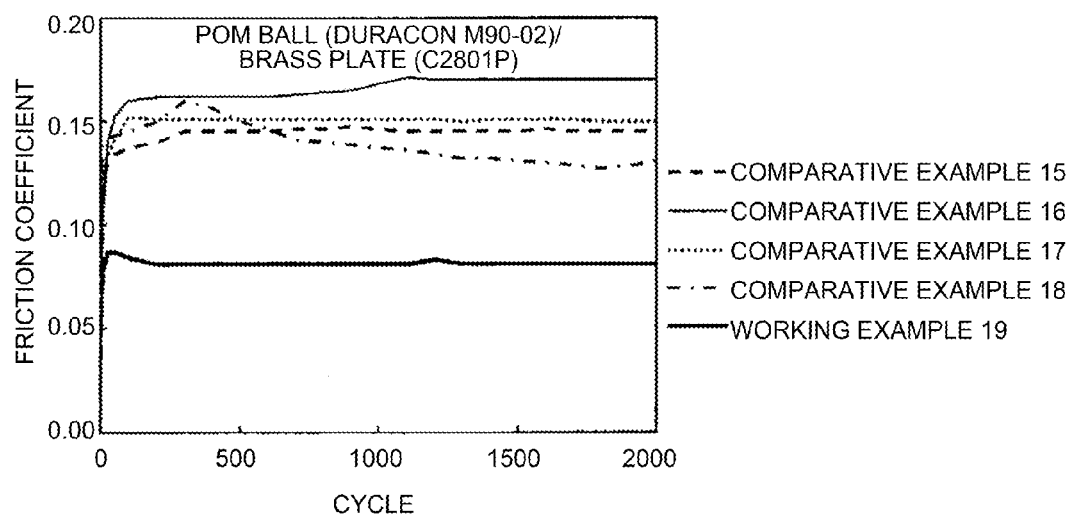
FIG. 7 is a graph illustrating a relation among types of greases, friction coefficients, and the number of friction cycles in a second test.

FIG. 7 illustrates the results of those experiments. From the comparison with Table 6, it is understood that the application of the grease compositions on the tooth flanks of the gears can further effectively reduce the noise.

TABLE 7

| | Grease | Base oil viscosity | Rate of lithium soap | Consistency | Noise improvment amount [dB] |
|---|---|---|---|---|---|
| Example 12 | Grease 4 | 18 | 4.9 | 376 | 2.9 |
| Example 13 | Grease 5 | 18 | 4.4 | 396 | 2.8 |
| Example 14 | Grease 6 | 18 | 5.4 | 361 | 2.4 |
| Comparative example 13 | Grease 1 | 24 | 10.8 | 300 | 0.7 |

Examples 15 and 16 and Comparative Example 14

In the second test drive device 920, a bracket 915 that fixes the motor 901 and has a thickness of 1.6 mm was changed to one having a thickness of 0.8 mm. In the improved device after the change, a grease composition was applied to all of the first portion P1, the second portion P2, the third portion P3, and the fourth portion P4, and a noise was measured. The measurement result was subtracted from the noise when no grease composition was applied and the bracket 915 having a thickness of 1.6 mm was used. The resulting value was obtained as a noise improvement amount. The experiment condition using the grease composition 4 was Example 15, the experiment condition using the grease composition 5 was Example 16, and the experiment condition using the grease composition 1 was Example 14. The noise improvement amount of Example 15 was 1.8 dB. The noise improvement amount of Example 16 was 1.4 dB.

The noise improvement amount of Example 14 was −0.7 dB. It was found that the condition in which the grease composition was applied and a bracket 915 having a smaller thickness was used was able to reduce the noise lower than the condition in which no grease composition was applied and a firm and strong bracket 915 having a thickness of 1.6 mm was used.

Examples 17 and 18

As the image forming apparatus, IPSiO SP 4310 manufactured by Ricoh Company, Ltd. was prepared. A noise generated from the image forming apparatus was measured as the noise when no grease was applied. Thereafter, the grease composition 4 was applied to the clearances between all of the slide bearings provided in the image formation unit and the shafts passing through the slide bearings in the image forming apparatus excluding the fixing device. The grease composition was also applied on 75% of all of the tooth flanks excluding those of the fixing device. A noise generated from the whole of the apparatus was measured after a test image was output on 250,000 pieces of recording sheets under an environment of 25° C. and 55% RH, and thereafter a noise improvement amount was obtained (Example 17). As another experiment, a noise improvement amount was obtained in the same manner as in Example 17 except that the grease composition 5 was used instead of the grease composition 4 (Example 18). The noise improvement amount was 4.4 dB in Example 17, while the noise improvement amount was 4.5 dB in Example 18, which were favorable results.

As described above, it was found that the noise can be effectively reduced when the clearance between the slide bearing and the shaft passing through the slide bearing is set in a range of 10 to 110 μm and the grease composition having a consistency in a range of 360 to 400 is applied between the slide bearing and the shaft. In addition, it was found that the noise can be effectively reduced when the grease composition is used that contains a hydrocarbon base oil (A) and lithium soap (B) serving as a thickener, and the ratio of (A) to (B) is in a range of 94.5:5.5 to 96.0:4.0.

The drive device according to the present invention includes a slide bearing, a shaft passing through the slide bearing, a gear fixed to the shaft, and a grease composition held in the clearance between the slide bearing and the shaft. At least one of the slide bearing and the shaft is made of a resin. The clearance is in a range of 10 to 110 μm. The grease composition contains the hydrocarbon base oil and the lithium soap. The weight ratio of the hydrocarbon base oil to the lithium soap (hydrocarbon base oil:lithium soap) is adjusted in a range of 94.5:5.5 to 96.0:4.0. The consistency of the grease composition is adjusted in a range of 360 to 400.

The drive device according to the present invention transmits rotation energy of the driving motor to an object to be driven through a plurality of gears so as to drive the object. Belts and pulleys may be provided in addition to the gears as needed. The number of objects to be driven is basically one, but multiple objects may be driven. The drive device according to the present invention may drive the object to be driven at an appropriate speed by reducing or increasing the rotational speed of the driving motor through the gears.

The drive device according to the present invention includes at least one gear that is fixed to the shaft passing through the slide bearing and rotates with the shaft. In addition to the gear, another gear may be provided that has a through hole and rotates on a fixed shaft while the fixed shaft is inserted into the through hole. The gear that is fixed to the shaft passing through the slide bearing and rotates with the shaft can be fixed to the shaft with a setscrew, a taper joint, a key joint, a spline joint, or a friction joint, for example. The gear may be formed by being integrated with the shaft. The shaft rotates with the gear while passing through the slide bearing and being supported by the slide bearing. Known examples of the bearing include a slide bearing, a ball bearing, and a roller bearing. The drive device according to the present invention includes at least the slide bearing, and the shaft passing through the slide bearing and the gear fixed to the shaft. The slide bearing, the structure of which is simpler than those of other bearings, has an advantage of being used for manufacturing a compact drive device because of its low manufacturing cost, light weight, and compact size.

The drive device according to the present invention includes at least one set of the slide bearing and the shaft passing through the slide bearing, and at least one of the slide bearing and the shaft is made of a resin. At least one of the slide bearing and the shaft passing through the slide bearing is made of a resin that achieves a light weight and has an excellent workability, thereby making it possible to provide a compact, lightweight, and low cost drive device.

Any metallic materials and resin materials can be used as the material for the slide bearing used in the drive device according to the present invention. In view of a lightweight property and cost, resin materials are preferably used. Examples of the resin materials used for the slide bearing include a fluororesin, a polyacetal resin, a polyphenylene sulfide resin, and a polyether ether ketone resin. In view of durability and cost, the polyacetal resin is most preferred.

Any metallic materials and resin materials can be used for the material of the shaft passing through the slide bearing used in the drive device according to the present invention. A metallic material is preferably used for the shaft that rotates at a high speed and receives high torque, while a resin material is preferably used for the shaft that rotates at a low speed and receives low torque. Examples of the metallic materials that can be used for the shaft passing through the slide bearing include alloys and various metals. In view of durability, workability, and cost, the metallic material is preferably a stainless steel or a free-cutting steel. Examples of the resin materials that can be used for the shaft passing through the slide bearing include a fluororesin, a polyacetal resin, a polyphenylene sulfide resin, and a polyether ether ketone resin. In view of durability and cost, the polyacetal resin is the most preferable.

The clearance between the slide bearing used in the drive device according to the present invention and the shaft passing through the slide bearing is in a range of 10 to 110 μm, preferably 20 to 100 μm, and more preferably 25 to 90 μm. When the clearance between the slide bearing and the shaft is smaller than 10 μm, the slide bearing or the shaft is readily damaged due to the contact therebetween in the assembly and in being driven, thereby causing the rotation of the shaft to be unstable. As a result, unfavorably, a noise becomes large and the durability of the slide bearing or the shaft is reduced. In particular, when one of the slide bearing and the shaft is made of a metallic material while the other is made of a resin material, the influence of the noise is markedly increased. When the clearance between the slide bearing and the shaft is larger than 110 μm, the shaft rotates unstably due to the poor fixation of the shaft. As a result, unfavorably, a noise becomes large and the durability of the slide bearing or the shaft is reduced.

Figure 3:
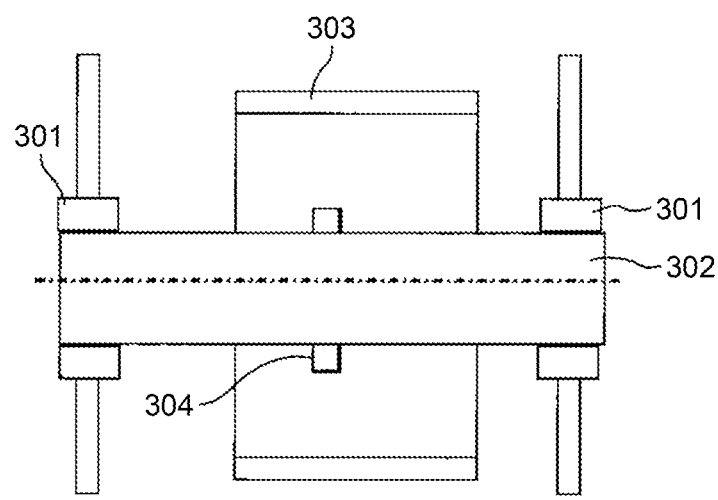
FIG. 3 is a main structural diagram illustrating a main part of a drive device according to an embodiment.

FIG. 3 is a main structural diagram illustrating a main part of the drive device according to the embodiment. The drive device according to the embodiment includes at least, as illustrated in FIG. 3, slide bearings 301, a shaft 302 passing through the slide bearings 301, and a gear 303 fixed to the shaft 302 such that the gear 303 rotates integrally with the shaft 302. The gear 303 is prevented from rotating on the shaft 302 in an idling manner, by being caught by a rotation preventive member 304. The drive device is provided with at least one set of the slide bearings 301, the shaft 302, and the gear 303. The slide bearings 301 have the same structural relation with respect to the shaft 302. The structural relation with respect to the shaft 302 is, thus, described on one slide bearing 301 in the following description.

A grease composition (hereinafter, also described as a grease composition according to the embodiment) is provided between the slide bearing 301 and the shaft 302. The grease composition contains a hydrocarbon base oil (A) and lithium soap (B) serving as a thickener. The ratio of the hydrocarbon base oil (A) to the lithium soap (B) is in a range of 94.5:5.5 to 96.0:4.0. The consistency of the grease composition is in a range of 360 to 400. The shaft 302 is supported by a fluid oil film pressure produced by the grease composition provided between the slide bearing 301 and the shaft 302, resulting in the shaft 302 being smoothly rotated without receiving a frictional resistance. As a result, a noise is hardly generated. Consequently, the semi-permanent operating lives of the slide bearing 301 and the shaft 302 can be achieved.

When the drive device according to the embodiment is provided with a plurality of combinations of the slide bearing 301, the shaft 302, and the gear 303 (hereinafter the combination is referred to as the "shaft set"), the grease composition is preferably provided between the slide bearing 301 and the shaft 302 in all of the shaft sets. In the "shaft set" including the shaft 302 that rotates at a relatively low speed and receives small torque, the grease composition may not be provided between the slide bearing 301 and the shaft 302 in view of the cost. In at least one out of all of the "shaft sets", the grease composition is provided between the slide bearing 301 and the shaft 302.

The drive device according to the embodiment includes gears (not illustrated) in addition to the gear 303 illustrated in FIG. 3. The grease composition according to the embodiment is preferably applied to the tooth flanks of the gears to obtain an effect of being capable of further reducing a noise generated from the drive device. A grease composition generally used for preventing a noise, which differs from the grease composition according to the embodiment, may be used as the grease composition applied on the tooth flanks. However, if the grease composition generally used for preventing a noise is erroneously provided between the slide bearing 301 and the shaft 302, a noise is probably worsened. Thus, careful attention needs to be paid so as to prevent the erroneous use of the grease composition in the assembly process of the drive device. The grease composition according to the embodiment exhibits an excellent effect on reducing a noise between the tooth flanks when the grease composition is applied to the tooth flanks of the gears and used. Accordingly, in view of simplification of the assembly process of the drive device and the noise prevention, the grease composition according to the embodiment is preferably applied to the tooth flanks.

As described above, the consistency of the grease composition according to the embodiment is in a range of 360 to 400, and preferably in a range of 365 to 395. The grease composition having a consistency smaller than 360 is hardly provided uniformly between the slide bearing 301 and the shaft 302, and thus hardly maintains the fluid oil film pressure uniformly. As a result, the grease composition unfavorably causes a noise to become larger and may reduce the durability of the slide bearing 301 and the shaft 302. The grease composition having a consistency larger than 400 may unfavorably behave in the following ways where the clearance between the slide bearing 301 and shaft 302 is in a range of 10 to 110 µm. With the progress of the operation of the drive device, the grease composition flows from the clearance between the slide bearing 301 and the shaft 302 to the outside of them, thereby causing the fluid oil film pressure to be difficult to be maintained uniformly. As a result, a noise becomes larger and the durability of the slide bearing 301 and the shaft 302 is reduced. When the grease composition having a consistency larger than 400 is applied to the tooth flanks of the gears in the drive device for the purpose of further reduction of a noise or further increase in durability of the gears, the grease composition tends to be readily scattered from the tooth flanks of the gears with the progress of the operation of the drive device. As a result, unfavorably, it becomes difficult to maintain an effect of reducing a noise or increasing the durability of the gears over a long period of time in addition to the contamination of the drive device and the peripheral device due to the scattered grease composition. The consistency of the grease composition is measured in accordance with JIS K2220.

In the grease composition according to the embodiment, the ratio of the hydrocarbon base oil (A) to the lithium soap (B) serving as a thickener is in a range of 94.5:5.5 to 96.0:4.0. When the ratio of the amount of the thickener to that of the base oil is larger than the range described above, the grease composition becomes hard and may increase a resistance to stirring. When the ratio of the amount of the thickener to that of the base oil is smaller than the range, the grease composition softens and unfavorably may leak from the clearance.

Any hydrocarbon base oils can be used as the hydrocarbon base oil of the grease composition according to the embodiment regardless of the types of mineral oils and synthetic oils or regardless of being used singly or as a mixture. Examples of the hydrocarbon base oils include mineral oils typified by a paraffin-based oil and a naphthene-based oil, ester synthetic oils typified by diester and polyol ester, olefin synthetic oils typified by poly-α-olefin, α-olefin oligomer, polybutene, and polyisobutylene, and ester synthetic oils typified by alkylene diphenyl ether and polyalkylene ether. The olefin synthetic oils are preferable that cause relatively little damage on the resin material and have an excellent balance between heat resistance and low temperature property. These base oils can be singly used or as a combination of two or more oils. The kinetic viscosity of the base oil is preferably equal to or smaller than 20 mm$^2$/s at 40° C. in order to rotate the gears and the shaft smoothly and reduce a noise of the whole of the drive device.

Any lithium soap can be used as the thickener of the grease composition according to the embodiment regardless of being used singly or as a mixture. Examples of the lithium soap include lithium salts of monocarboxylic fatty acid or hydroxy monocarboxylic fatty acid and lithium salts of a vegetable oil such as a seed oil and an animal oil used for manufacturing lithium soap or fatty acids derived from the oils. The lithium salt of monocarboxylic fatty acid or hydroxy monocarboxylic fatty acid is preferable. In particular, the lithium salt of monocarboxylic fatty acid or hydroxy monocarboxylic fatty acid having 8 to 12 carbon atoms is preferable. More specifically, examples of the lithium salt of monocarboxylic fatty acid include the lithium salts of lauric acid, myristic acid, palmitic acid, stearic acid, behenic acid, myristoleic acid, palmitoleic acid, oleic acid, and linoleic acid, while examples of the lithium salt of hydroxy monocarboxylic fatty acid include the lithium salts of 12-hydroxystearic acid, 14-hydroxystearic acid, 16-hydroxystearic acid, 6-hydroxystearic acid, and 9,10-hydroxystearic acid. Furthermore, straight-chain monocarboxylic fatty acid or straight-chain hydroxy monocarboxylic fatty acid, which has an excellent durability with respect to the lubrication portion composed of a metallic member and a resin member, is preferable. More specifically, lithium stearate or lithium 12-hydroxystearate is preferably used.

To the grease composition according to the embodiment, additives typically mixed may be added besides the hydrocarbon base oil and the lithium soap depending on the intended use. Examples of the additives include a solid lubricant, a thickener, an antioxidant, an extreme-pressure additive, an oily additive, a rust preventive agent, a corrosion inhibitor, a metal deactivator, dyes, a hue stabilizer, a viscosity-index improving agent, and a structure stabilizer. In particular, a solid lubricant is preferably added so as to prevent poor lubrication due to oil film shortage, rotate the gears and shaft smoothly, reduce a noise of the whole of the drive device, and increase the durability. Any solid lubricants can be used regardless of being used singly or as a mixture. Examples of the solid lubricant include layered compounds typified by melamine cyanurate, molybdenum disulfide, boron nitride, graphite, mica, and graphite fluoride, fluororesins typified by polytetrafluoroethylene (PTFE), tetrafluoroethylene-perfluoroalkylvinylether copolymer (PFA), tetrafluoroethylene-hexafluoropropylene copolymer (FEP), ethylene-tetrafluoroethylene copolymer (ETFE), polyvinylidene difluoride (PVDF), and polychlorotrifuruoroethylene (PCTFE), metal oxides typified by titanium dioxide and zinc oxide, and powder of synthetic resins typified by polyolefin and polyamide. In order to cause the gears and the shaft to continue the smooth rotation, the olefin resin powder is preferably used as the solid lubricant because the olefin resin powder is readily dispersed in a very soft grease composition having a consistency ranging from 360 to 400. The content of the olefin resin powder serving as the solid lubricant is preferably in a range of 1 to 20% by mass with respect to the total mass of the grease composition, and more preferably from 2 to 10% by mass. Excessive olefin resin powder may unfavorably increase the rotation resistances of the gears.

The grease composition according to the embodiment has a consistency ranging from 360 to 400, which is very soft. Because of the softness, a styrene thickener is preferably used for the purpose of preventing the grease composition from being dripped and scattered from the sliding surfaces of the gears and the shafts, causing the gear having a through hole through which the shaft passes and the shaft passing through the slide bearing to smoothly rotate, reducing a noise generated from the whole of the drive device, and increasing the durability. The content of the styrene thickener is preferably in a range of 1 to 20% by mass with respect to the total mass of the grease composition, and more preferably, 2 to 10% by mass. When an excessively large amount of the styrene thickener is added, the consistency cannot be adjusted in a range of 360 to 400 in a case in which the ratio of the hydrocarbon base oil to the lithium soap is in a range of 94.5:5.5 to 96.0:4.0. As a result, the rotation resistances of the gears may be further increased. When an excessively small amount of the styrene thickener is added, the expected role of the styrene thickener unfavorably may not be achieved. The expected role is to prevent the grease composition from being dripped and scattered from the sliding surfaces of the gears and the shafts, cause the gear and the shaft to smoothly rotate, reduce a noise generated from the whole of the drive device, and increase the durability.

The drive device according to the embodiment generates few noises and has an excellent durability, thereby making it possible to be mounted on various apparatuses. Examples of the various apparatuses include apparatuses operating in quiet offices or closed spaces or in quiet environments such as in a midnight environment, and apparatuses operating just near people. In particular, the drive device can be preferably used for image forming apparatuses (e.g., printers, facsimiles, copying machines, and multifunctional peripherals) using a heat transfer technique, a thermal technique, an inkjet technique, or an electrophotographic technique, for example, because of the following reasons. Such image forming apparatuses are widely used in homes and offices. With the progress of downsizing of the image forming apparatuses, they are installed just near users. As a result, the reduction of noises is strongly required.

At the portion in which the grease composition according to the embodiment is provided, a friction coefficient between resins, a friction coefficient between a resin and a metal or an alloy, or a friction coefficient between a metal or an alloy and a metal or an alloy is preferably small over a long period. In particular, it is greatly preferable for the friction coefficient, which is obtained in the manner described below, of the grease composition using olefin resin powder to be maintained over a long period such that the friction coefficient is equal to or smaller than 0.15, preferably equal to or smaller than 0.13, and more preferably in a range of 0.01 to 0.12. The friction coefficient is measured in a range of 10 to 2000 cycles in a test in which a ball with a ½-inch diameter is slid on a plate on which a certain grease composition is applied using a reciprocating tester. In the measurement of the friction coefficient using the reciprocating tester, the measurement values of the friction coefficient can be unstable depending on the application state of the grease composition at an initial stage of the cycle (smaller than 10 cycles) in some cases. It is, thus, important that the friction coefficient is measured in a range of 10 to 2000 cycles, in which case the grease composition is in a stable application state.

Figure 5:
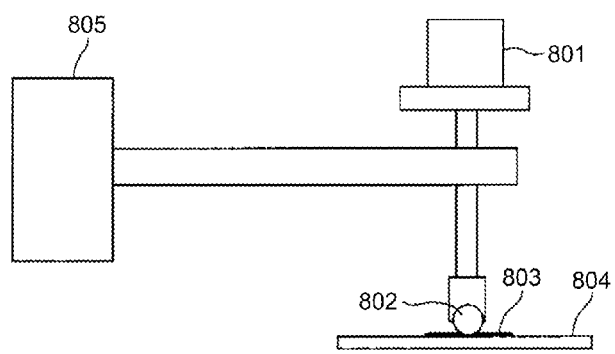
FIG. 5 is a schematic structural diagram illustrating a device used for measuring a friction coefficient.

The friction coefficient of the grease composition using olefin resin powder according to the embodiment is small over a long period. The grease composition, thus, greatly contributes to the improvement of the reliability of the drive device. For reference, the friction coefficients of the grease composition used in Example 19 (the grease composition 4 used in Example 5 was used) and the grease compositions conventionally used for the drive devices of the image forming apparatus were measured using the device illustrated in FIG. 5. As illustrated in FIG. 5, the device is provided with a weight 801, a nylon 66 ball 802 with a ½-inch diameter (product name: AMILAN CM3001-N), and a load cell 805, for example. As for the conventionally used grease compositions, those in Comparative example 15 (containing olefin oil, lithium soap, PTFE, and melamine cyanurate, and the consistency was 333), Comparative example 16 (containing dimethyl silicone oil and lithium soap, and the consistency was 357), Comparative example 17 (containing perfluoroether oil and PTFE, and the consistency was 250), and Comparative example 18 (containing olefin oil and urea, and the consistency is 262) were used. The measurement was carried out as follows. Each of the grease compositions (a grease composition 803 illustrated in FIG. 5) was applied on a POM plate (DURACON SW-01) 804 with a thickness of 0.1 mm. The friction coefficient was measured when the nylon 66 ball 802 with a ½-inch diameter (product name: AMILAN CM3001-N) was slid under the conditions in which a load was 0.49 N, a sliding speed was 60 cpm, and a sliding distance was 40 mm.

Figure 6:
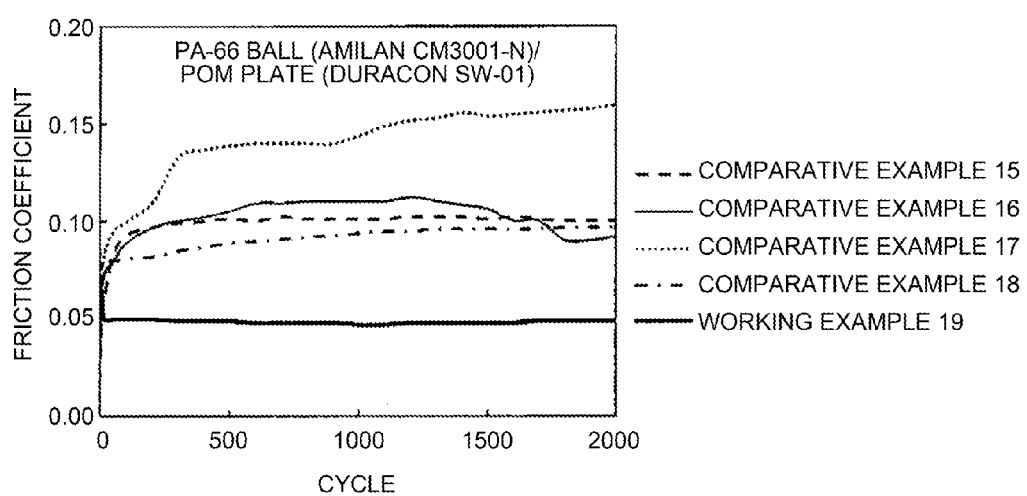
FIG. 6 is a graph illustrating a relation among types of greases, friction coefficients, and the number of friction cycles in a first test.

FIG. 6 is a graph illustrating the measurement results of the friction coefficients. As illustrated in FIG. 6, the grease composition in Example 19 has a smaller friction coefficient than the friction coefficients of those in Comparative examples 15, 16, 17, and 18, which are conventionally used. The friction coefficient of the grease composition in Example 19 is less fluctuated and stable over the friction cycles.

Then, the friction coefficients were measured in the same manner as described above except that a brass plate (C2801P) was used instead of the POM plate (DURACON SW-01) 804, and a POM ball (DURACON M90-02) was used instead of the nylon 66 ball 802 with a ½-inch diameter (AMILAN CM3001-N). FIG. 7 is a graph illustrating the measurement results of the friction coefficients. As illustrated in FIG. 7, the grease composition in Example 19 has a smaller friction coefficient than the friction coefficients of those in Comparative examples 15, 16, 17, and 18, which are conventionally used. The friction coefficient of the grease composition in Example 19 is less fluctuated and stable over the friction cycles.

Figure 8:
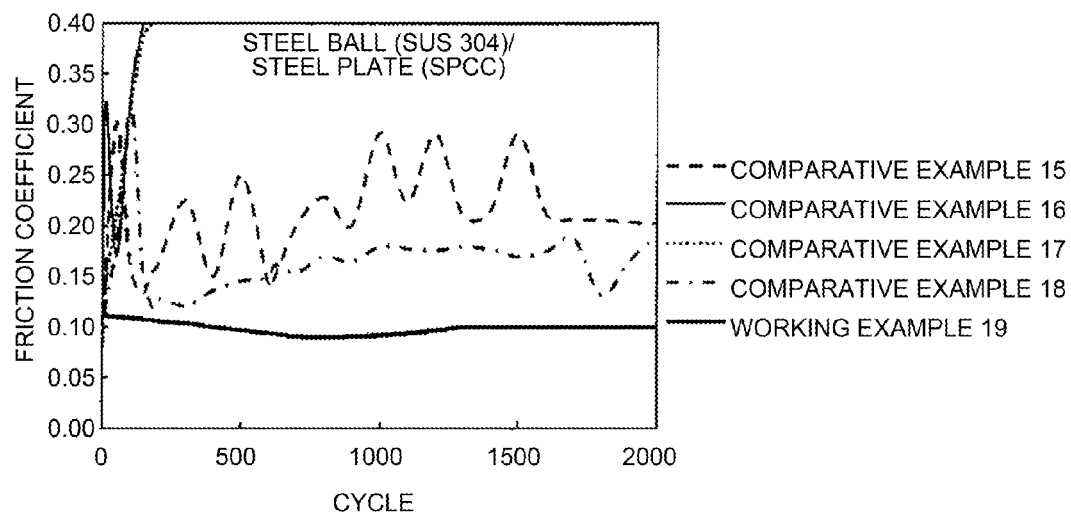
FIG. 8 is a graph illustrating a relation among types of greases, friction coefficients, and the number of friction cycles in a third test.

The friction coefficients were measured in the same manner as described above except that a steel plate (SPCC) was used instead of the POM plate (DURACON SW-01) 804 and a steel ball (SUS 304, which is a stainless steel) was used instead of the nylon 66 ball 802 with a ½-inch diameter (AMILAN CM3001-N). FIG. 8 is a graph illustrating the measurement results of the friction coefficients. As illustrated in FIG. 8, the grease composition in Example 19 has a smaller friction coefficient than the friction coefficients of those in Comparative examples 15, 16, 17, and 18, which are conventionally used. The friction coefficient of the grease composition in Example 19 is less fluctuated and stable over the friction cycles.

The grease composition according to the embodiment has excellent storage conservation. In particular, the grease composition using the styrene thickener according to the embodiment has a very small oil separation degree measured in accordance with JIS K2220. The oil separation degree can be reduced to equal to or smaller than 0.2%, preferably equal to or smaller than 0.15%, and more preferably equal to or smaller than 0.1%. In this way, the grease composition according to the embodiment has excellent storage conservation and stability. The grease composition using the styrene thickener according to the embodiment greatly contributes to the improvement of the reliability of the drive device.

Figure 9:
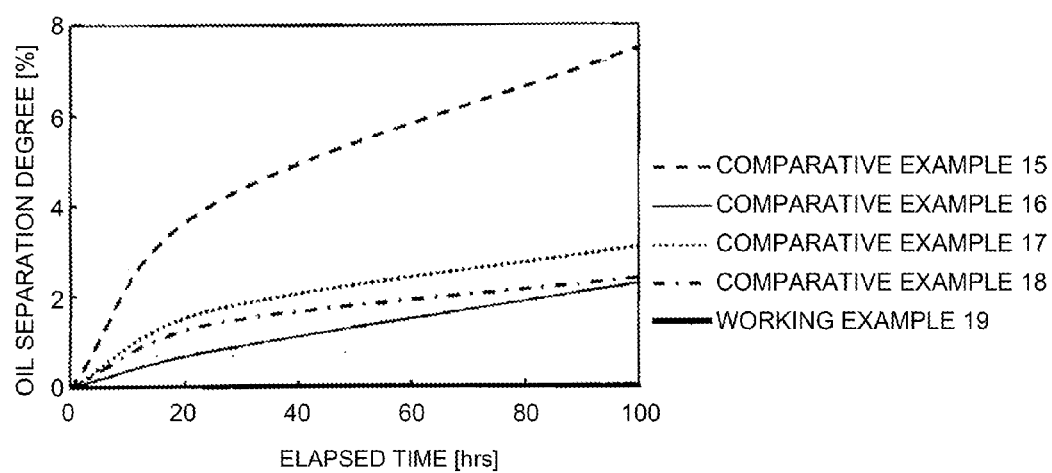
FIG. 9 is a graph illustrating a relation among types of greases, oil separation degrees, and elapsed time in a fourth test.

For reference, aging of the oil separation degrees of the grease composition according to the embodiment (that in Example 19) and the grease compositions in Comparative examples 15, 16, 17, and 18 was measured. Specifically, the aging of the oil separation degrees was measured by an oil separation degree measurement method in accordance with JIS K2220 at 100° C. for 100 hours. FIG. 9 is a graph illustrating the measurement results of the aging. The grease composition in Example 19 has a smaller aging change in oil separation degree than the aging changes in oil separation degree of those in Examples 15, 16, 17, and 18. The oil separation degree of the grease composition in Example 19 does not change at 100° C. for 100 hours practically. The grease composition in Example 19 thus has excellent storage conservation and stability.

The following describes an image forming apparatus, on which the multiple drive devices according to the present invention are mounted, according to the embodiment. The image forming apparatus, which can demonstrate an exceptional effect of reducing a noise, according to the embodiment is an example of the image forming apparatus according to the present invention. The image forming apparatus according to the present invention is not limited to the image forming apparatus according to the embodiment.

Figure 4:
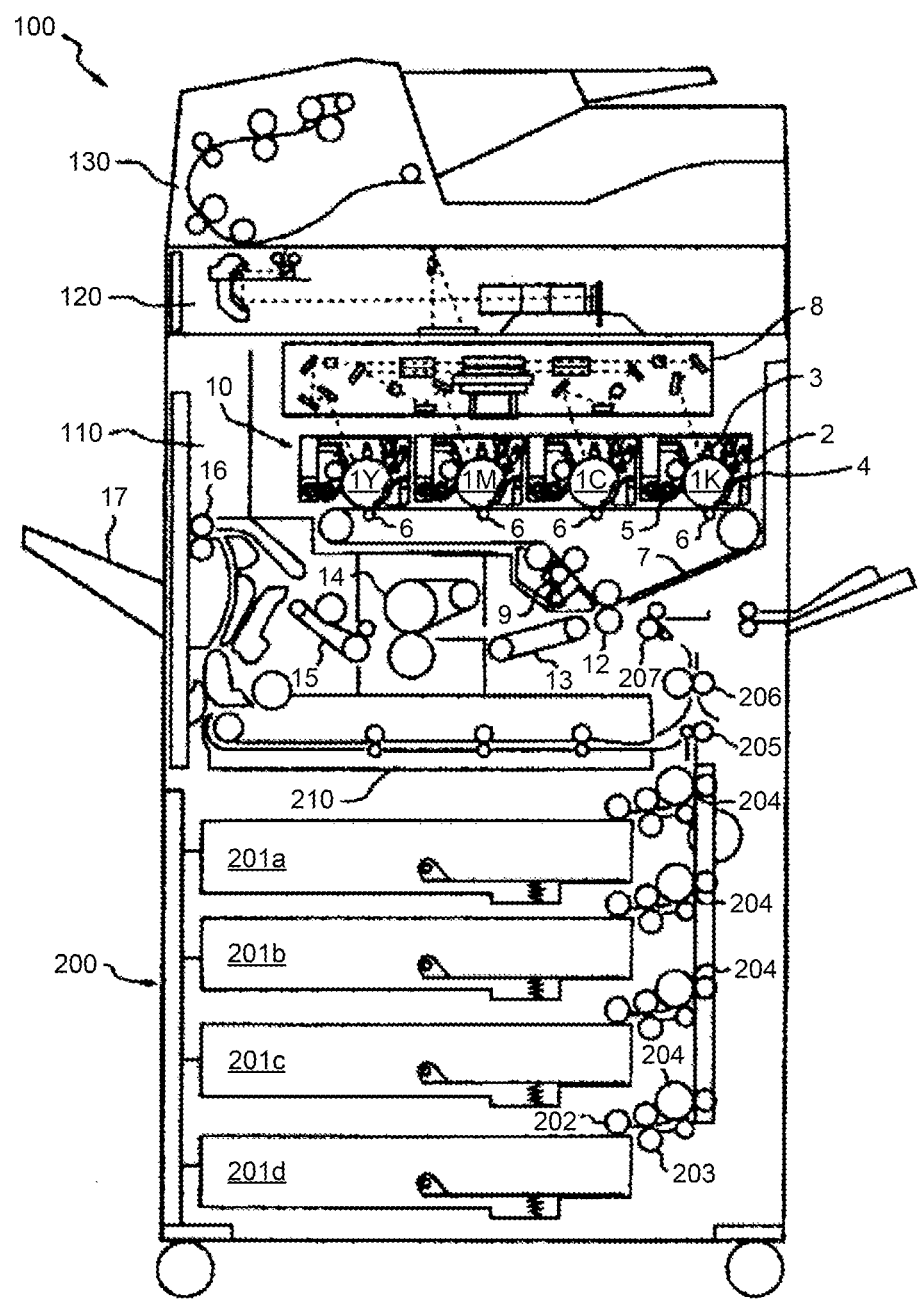
FIG. 4 is a schematic structural diagram illustrating an image forming apparatus according to the embodiment.

FIG. 4 is a schematic structural diagram illustrating an image forming apparatus 100 according to the embodiment. The image forming apparatus 100 includes a body (printer unit) 110 that performs image formation, a document reader (scanner unit) 120 that is provided above the body 110, an automatic document feeder (ADF) 130 provided above the document reader 120, and a paper feeding unit 200 provided under the body 110, and has a function of a copying machine. The image forming apparatus 100 has a function to communicate with external apparatuses. The image forming apparatus 100 can be used as a printer or a scanner by being connected to an external apparatus such as a personal computer. In addition, the image forming apparatus 100 can be used as a facsimile by being connected to a telephone line or an optical communication line.

In the body 110, four image forming units (image forming stations) 10 are disposed side by side. The image forming units 10 have the same structure and use different toner colors from each other. The four image forming units 10 form different color toner images from each other using toner of the respective different colors (e.g., yellow (Y), magenta (M), cyan (C), and black (K)). Color toner images are transferred onto an intermediate transfer medium 7 to overlap one another, thereby making it possible to form a multi-color or full color image.

The four image forming units 10 are disposed side by side along the intermediate transfer medium 7 that has a belt shape and is stretched by a plurality of rollers. The respective color toner images formed by the image forming units 10 are sequentially transferred onto the intermediate transfer medium 7 to overlap one another. Thereafter, the overlapped toner images are transferred at once by a secondary transfer device 12 onto a transfer medium having a sheet shape such as paper.

The four image forming units 10 each include, around respective drum-shaped photoconductors 1 (1Y, 1M, 1C, and 1K), a protective agent application device 2, a charging device 3, an exposure unit that guides writing light (e.g., laser light) emitted from a latent image forming device 8 to the corresponding photoconductor 1, a developing device 5, a primary transfer device 6, and a cleaning device 4. The image forming units 10 for the respective colors each have a process cartridge that houses the photoconductor 1, the protective agent application device 2 (including the cleaning device 4), the charging device 3, and the developing device 5 in a common cartridge. The process cartridges are attached to the body 110 in a detachable manner.

The following describes the operation of the image forming apparatus 100. A series of processes for image forming is described in a negative-positive process as an example. The four image forming units 10 operate in the same manner, and the operation of one of the image forming units 10 is described as an example.

The drum-shaped photoconductor 1, which is an image bearer typified by an organic photo conductor (OPC) having an organic photoconductive layer, is neutralized by a discharge lamp (not illustrated), for example, and thereafter is uniformly charged to a minus polarity by the charging device 3 having a charging member (e.g., a charging roller). When the photoconductor 1 is charged by the charging device 3, a charging voltage appropriate for charging the photoconductor 1 to a desired potential is applied to the charging member from a voltage applying mechanism (not illustrated). The charging voltage has an appropriate magnitude or is the voltage in which an alternating voltage is superimposed on the voltage.

The charged photoconductor 1 is optically scanned by laser light emitted from the latent image forming device 8 employing a laser scanning technique. The latent image forming device 8 includes a plurality of laser light sources, a coupling optical system, a light deflector, and a scanning imaging forming optical system, for example. The area exposed by the optical scanning in the entire surface of the photoconductor 1 forms an electrostatic latent image (the absolute value of the potential of the exposed area is smaller than the absolute value of the potential of the unexposed area). Laser light emitted from the laser light source (e.g., a semiconductor laser) is deflected by the light deflector including a polygon mirror having a polygonal shape and rotating at a high speed for scanning, and scans the surface of the photoconductor 1 in a rotational axis direction (main-scanning direction) of the photoconductor 1 through the scanning imaging forming optical system including a scanning lens and mirrors.

The latent image thus formed on the surface of the photoconductor 1 is developed with toner particles or a developer including a mixture of toner particles and carrier particles carried on a developing sleeve of a developing roller 51 serving as a developer bearer of the developing device 5. As a result, a toner image is formed. When the latent image is being developed, a developing bias is applied to the developing sleeve of the developing device 51 from the voltage applying mechanism (not illustrated). The developing bias is a voltage having an appropriate magnitude the value of which is between those of the exposed area and the unexposed area of the photoconductor 1 or a bias in which an alternating voltage is superimposed on the voltage.

The toner images formed on the respective photoconductors 1 of the image forming units 10 for respective colors are sequentially primarily transferred onto the intermediate transfer medium 7 to overlap one another by the primary transfer device 6 including transfer rollers. In synchronization with the image forming operation and the primary transfer operation, any one cassette is selected out of paper feeding cassettes 201a, 201b, 201c, and 201d, which are arranged in multiple steps in the paper feeding unit 200. From the selected paper feeding cassette, a transfer medium having a sheet shape such as paper is fed by a paper feeding mechanism including a paper feeding roller 202 and separation rollers 203, and conveyed to a secondary transfer unit through conveyance rollers 204, 205, and 206, and registration rollers 207.

In the secondary transfer unit, the toner image on the intermediate transfer medium 7 is secondarily transferred onto the transfer medium conveyed to the second transfer unit by a secondary transfer device (e.g., secondary transfer rollers) 12. In the transfer process, a potential having the polarity opposite to the polarity of the charged toner is preferably applied to the primary transfer device 6 and the secondary transfer device 12 as a transfer bias.

After passing through the secondary transfer unit, the transfer medium is separated from the intermediate transfer medium 7. Toner particles remaining on the photoconductor 1 after the primary transfer is collected by a cleaning member 41 of the cleaning device 4 into a toner collection chamber in the cleaning device 4. Toner particles remaining on the intermediate transfer medium 7 after the secondary transfer are collected by a cleaning member of a belt cleaning device 9 into a toner collection chamber in the belt cleaning device 9.

The image forming apparatus 100 has what is called a tandem structure, in which the multiple image forming units 10 for the respective colors are disposed along the intermediate transfer medium 7, and forms an image on the transfer medium by an intermediate transfer technique. As already described above, the toner images of different colors from each other formed on the respective photoconductors 1 (1Y, 1M, 1C, and 1K) of the image forming units 10 for respective colors are sequentially transferred onto the intermediate transfer medium 7 to overlap one another, and thereafter the overlapped toner images are transferred at once onto the transfer medium such as transfer paper. The transfer medium after the transfer is conveyed by a conveyance device 13 to a fixing device 14, in which the toner images are fixed on the transfer medium by heat, for example. After passing through the fixing device 14, the transfer medium is ejected by the conveyance device 15 and paper ejection rollers 16 into a paper ejection tray 17.

The image forming apparatus 100 has a both-side printing function. In both-side printing, the transfer medium only on one surface of which an image is fixed is conveyed to a conveyance device 210 for both-side printing by changing a conveyance path downstream from the fixing device 14. The conveyance device 210 for both-side printing inverts the front and rear surfaces of the transfer medium. Thereafter, the transfer medium is conveyed to the second transfer unit again by the conveyance rollers 206 and the registration rollers 207. The secondary transfer unit secondarily transfers an image onto the rear surface (the other surface) of the transfer medium. Thereafter, the transfer medium is conveyed to the fixing device 14 again. The fixing device 14 fixes the image on the rear surface of the transfer medium. Then, the transfer medium is conveyed to the paper ejection tray 17 so as to be ejected outside the image forming apparatus.

Instead of the tandem intermediate transfer system, a tandem direct transfer system may be employed. In this case, a transfer belt or the like that carries and conveys the transfer medium is used instead of the intermediate transfer medium 7. The toner images of different colors from each other sequentially formed on the respective photoconductors 1 (1Y, 1M, 1C, and 1K) of the four image forming units 10 are transferred onto the transfer medium on the transfer belt to directly overlap one another. The transfer medium is, then, conveyed to the fixing device 14, in which an image is fixed on the transfer medium by heat, for example.

The image forming apparatus thus structured includes a plurality of drive devices each of which individually drive the photoconductor 1, the cleaning device 4, and the developing device 5, the primary transfer device 6, the driving rollers that endlessly convey the intermediate transfer medium 7 while stretching it, and various conveyance rollers. The drive device according to the embodiment is employed as at least one of the multiple drive devices. In the fixing device 14, in which heat is generated, a different drive device from the drive device according to the embodiment is used because the grease softened by heat may flow out, for example.

The above descriptions are represented by way of example. The present invention also has particular advantages in the following aspects.

Aspect A

Aspect A provides a drive device that includes a slide bearing (e.g., the slide bearing 301), a shaft passing through the slide bearing (e.g., the shaft 302), and a gear fixed to the shaft (e.g., the gear 303), and a grease composition held in a clearance between the slide bearing and the shaft. At least one of the slide bearing and the shaft is made of a resin. The clearance is in a range of 10 to 110 μm. The grease composition contains a hydrocarbon base oil and lithium soap serving as a thickener. A weight ratio of the hydrocarbon base oil to the lithium soap (hydrocarbon base oil: lithium soap) is adjusted in a range of 94.5:5.5 to 96.0:4.0. A consistency of the grease composition is adjusted in a range of 360 to 400.

In this structure, the clearance between the slide bearing and the shaft is set to an appropriate value, and the grease composition in which the weight ratio of the hydrocarbon base oil to the lithium soap and the consistency are adjusted to the appropriate ranges is present in the clearance, thereby making it possible to prevent the occurrence of a noise while maintaining the smooth rotation of the shaft passing through the slide bearing.

Aspect B

Aspect B provides the drive device according to Aspect A, wherein one of the slide bearing and the shaft is made of a metal (including an alloy). In this structure, at least one of the slide bearing and the shaft is made of a metal, thereby making it possible to make the one strong and prolong the lifetime. Furthermore, even when the other (the slide bearing or the shaft different from the one) is made of a resin that achieves a light weight and a low production cost, the occurrence of a noise can be effectively prevented.

Aspect C

Aspect C provides the drive device according to Aspect B, wherein the shaft is made of a stainless steel or a free-cutting steel. This structure can prevent the occurrence of a noise even when the shaft made of a stainless steel or a free-cutting steel having a high strength is used.

Aspect D

Aspect D provides the drive device according to any one of Aspects A to C, wherein the slide bearing is made of a polyacetal resin. This structure can prevent the occurrence of a noise even when the slide bearing made of a polyacetal resin achieving a light weight and a low production cost is used.

Aspect E

Aspect E provides the drive device according to any one of Aspects A to D, wherein a kinetic viscosity of the hydrocarbon base oil is equal to or smaller than 20 mm$^2$/s at 40° C. This structure makes it possible to rotate the shaft smoothly by fully providing the grease composition containing the hydrocarbon base oil having a kinetic viscosity of equal to or smaller than 20 mm$^2$/s at 40° C. between the slide bearing and the shaft. As a result, the occurrence of a noise can be effectively prevented.

Aspect F

Aspect F provides the drive device according to any one of Aspects A to E, wherein the grease composition contains olefin resin powder. This structure can efficiently prevent the occurrence of a noise by uniformly providing the olefin resin powder, which is well dispersed in the hydrocarbon base oil, between the slide bearing and the shaft.

Aspect G

Aspect G provides the drive device according to any one of Aspects A to F further including a grease composition that is held on a tooth flank of the gear attached to the shaft and a tooth flank of another gear engaged with the gear attached to the shaft. The grease composition contains the hydrocarbon base oil and the lithium soap serving as the thickener, the weight ratio of the hydrocarbon base oil to the lithium soap (hydrocarbon base oil:lithium soap) is adjusted in a range of 94.5:5.5 to 96.0:4.0, and a consistency of the grease composition is adjusted in a range of 360 to 400. This structure can improve an assembly workability of the drive device (avoid the grease composition from being applied to a wrong place) using the grease composition having the same formulation for the grease composition that is provided between the slide bearing and the shaft, and between the tooth flank of the gear fixed to the shaft and the tooth flank of the other gear engaged with the gear fixed to the shaft. As a result, the productivity of the drive device can be increased.

Aspect H

Aspect H provides the drive device according to any one of Aspects A to G, wherein the grease composition held in the clearance contains a styrene thickener. The styrene thickener contained in the grease composition prevents oil separation from occurring in the grease composition. This structure can prevent the occurrence of a noise while avoiding malfunctions due to oil separation.

Aspect I

Aspect I provides an image forming apparatus that includes the drive device of any one of Aspects A to H. This structure can effectively prevent the occurrence of a noise from the drive device.

Aspect J

Aspect J provides a grease composition used for the drive device according to any one of Aspects A to H. This structure makes it possible for the grease composition to effectively prevent the occurrence of a noise from the drive device.

The present invention has an advantageous effect of preventing the occurrence of a noise while maintaining a smooth rotation of the shaft passing through the slide bearing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

7: intermediate transfer medium
10: image forming unit
100: image forming apparatus
110: body
120: document reader
130: ADF
301: slide bearing
302: shaft
303: gear

What is claimed is:

1. A drive device comprising:
a slide bearing;
a shaft that passes through the slide bearing;
a gear that is fixed to the shaft; and
a grease composition that is held in a clearance between the slide bearing and the shaft, wherein
at least one of the slide bearing and the shaft is made of a resin,
the clearance is in a range of 10 to 110 μm,
the grease composition contains a hydrocarbon base oil and lithium soap serving as a thickener, a weight ratio of the hydrocarbon base oil to the lithium soap is in a range of 94.5:5.5 to 96.0:4.0, and a consistency of the grease composition is in a range of 360 to 400.

2. The drive device according to claim 1, wherein one of the slide bearing and the shaft is made of a metal or an alloy.

3. The drive device according to claim 2, wherein the shaft is made of a stainless steel or a free-cutting steel.

4. The drive device according to claim 1, wherein the slide bearing is made of a polyacetal resin.

5. The drive device according to claim 1, wherein a kinetic viscosity of the hydrocarbon base oil is equal to or smaller than 20 mm2/s at 40□ C.

6. The drive device according to claim 1, wherein the grease composition contains olefin resin powder.

7. The drive device according to claim 1, wherein the grease composition is held on a tooth flank of the gear attached to the shaft and a tooth flank of another gear engaged with the gear attached to the shaft.

8. The drive device according to claim 1, wherein the grease composition held in the clearance contains a styrene thickener.

9. An image forming apparatus, comprising the drive device according to claim 1.

10. A grease composition used for the drive device according to claim 1.

* * * * *